INVENTOR.
GUSTAVE EHRENBERG
BY Arthur N. Swanson
ATTORNEY.

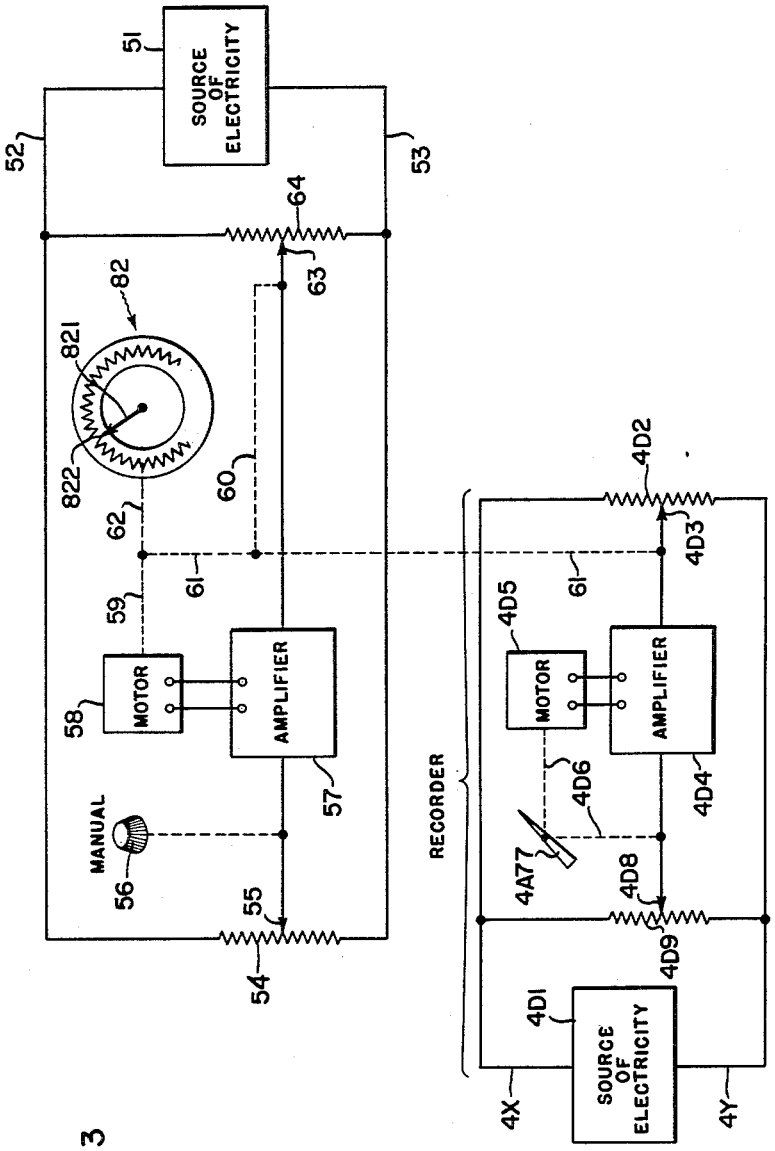

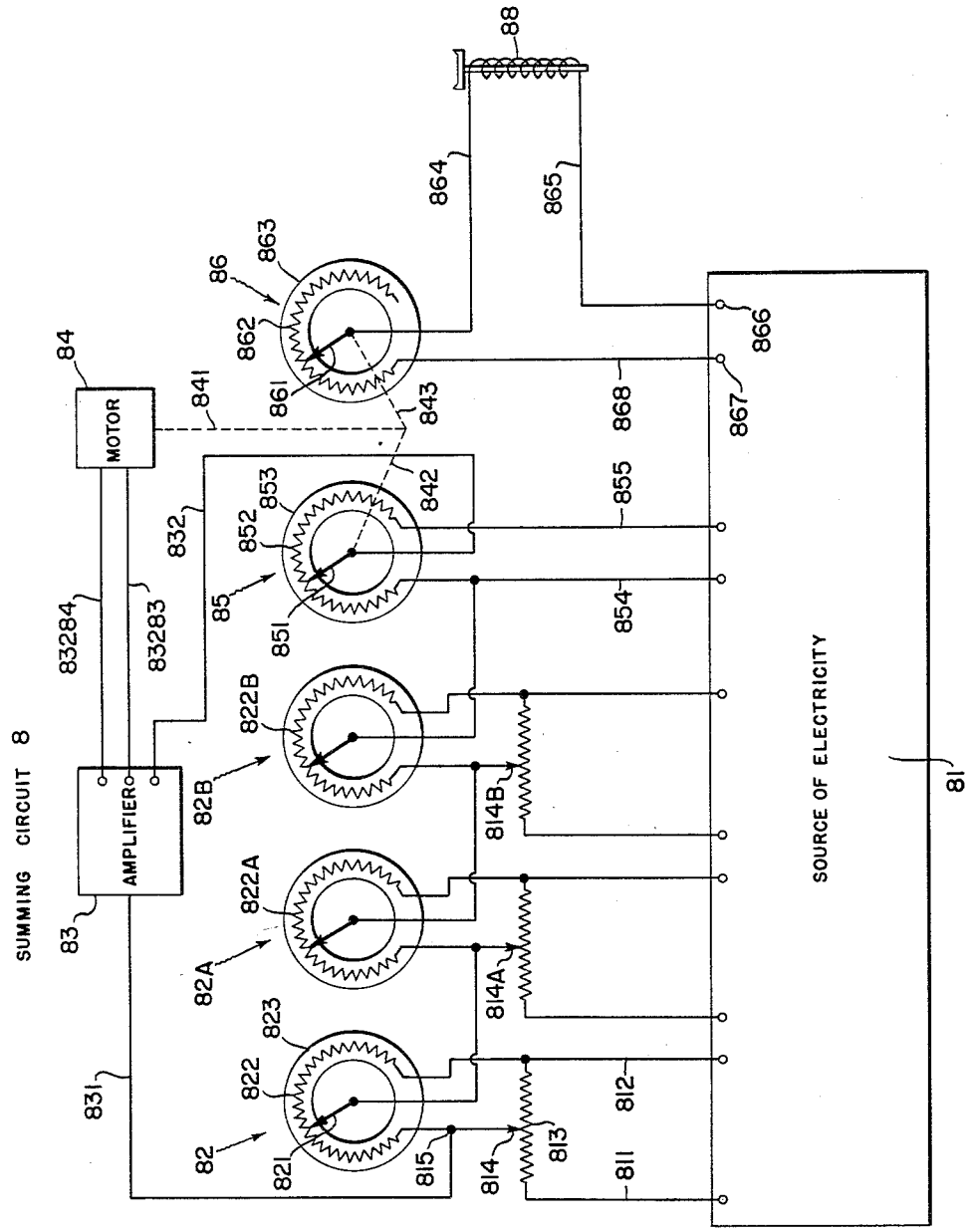

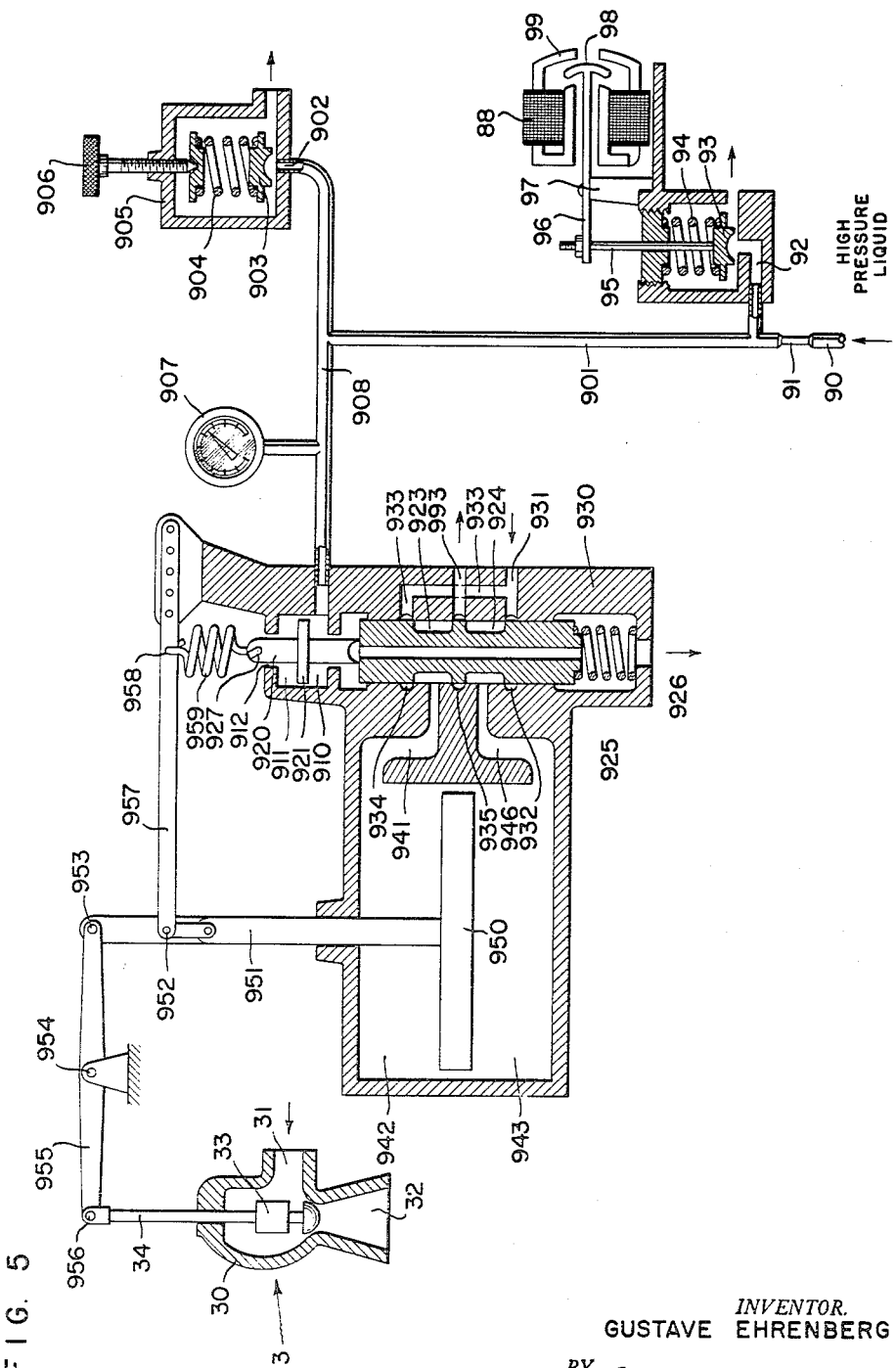

United States Patent Office 2,938,536
Patented May 31, 1960

2,938,536
CONTROLLER

Gustave Ehrenberg, Havertown, Pa., assignor to Minneapolis-Honeywell Regulator Company, Minneapolis, Minn., a corporation of Delaware Filed Oct. 29, 1957, Ser. No. 693,102

6 Claims. (Cl. 137—486)

This invention relates to a pumping station for a pipeline which conveys an expansible fluid, such as natural gas, or a liquid, such as petroleum. This fluid or liquid is conveyed through the pipeline by means of a pump, usually a centrifugal pump.

It is an object of this invention to provide means for protecting this pump by shutting down the pipeline upon the occurrence of any unusual condition.

More specifically, it is an object of this invention to protect such a pump by varying the flow of fluid or liquid through the pipeline by means of a valve which is actuated by any one of the three variables hereinafter named if the variable exceeds a predetermined point of value: (1) the pressure on the on-coming side of the pump, (2) the pressure on the off-going side of the pump, or (3) the flow of fluid or liquid through the pipeline.

This variation causes the flow to diminish or to cease altogether when this is necessary to prevent damage to the pipeline or to the pump.

A better understanding of the present invention may be had from the following detailed description when read in connection with the accompanying drawings in which:

Fig. 3 is an electric circuit diagram showing the means for manually adjusting the preselected or set point which serves as a datum or base from which the control of the measurements of the pressure gauge are made and showing the other pen of the recorder actuated by said means;

Fig. 4 is an electric circuit diagram showing the summing circuit and the coil which forms the energizing element for the hydraulic actuator for the final control valve; and Fig. 5 is a hydraulic circuit diagram showing the liquid-operated connection between the coil for the solenoid, which forms the output of the summing circuit, and the final control or throttling valve.

Figure 1:
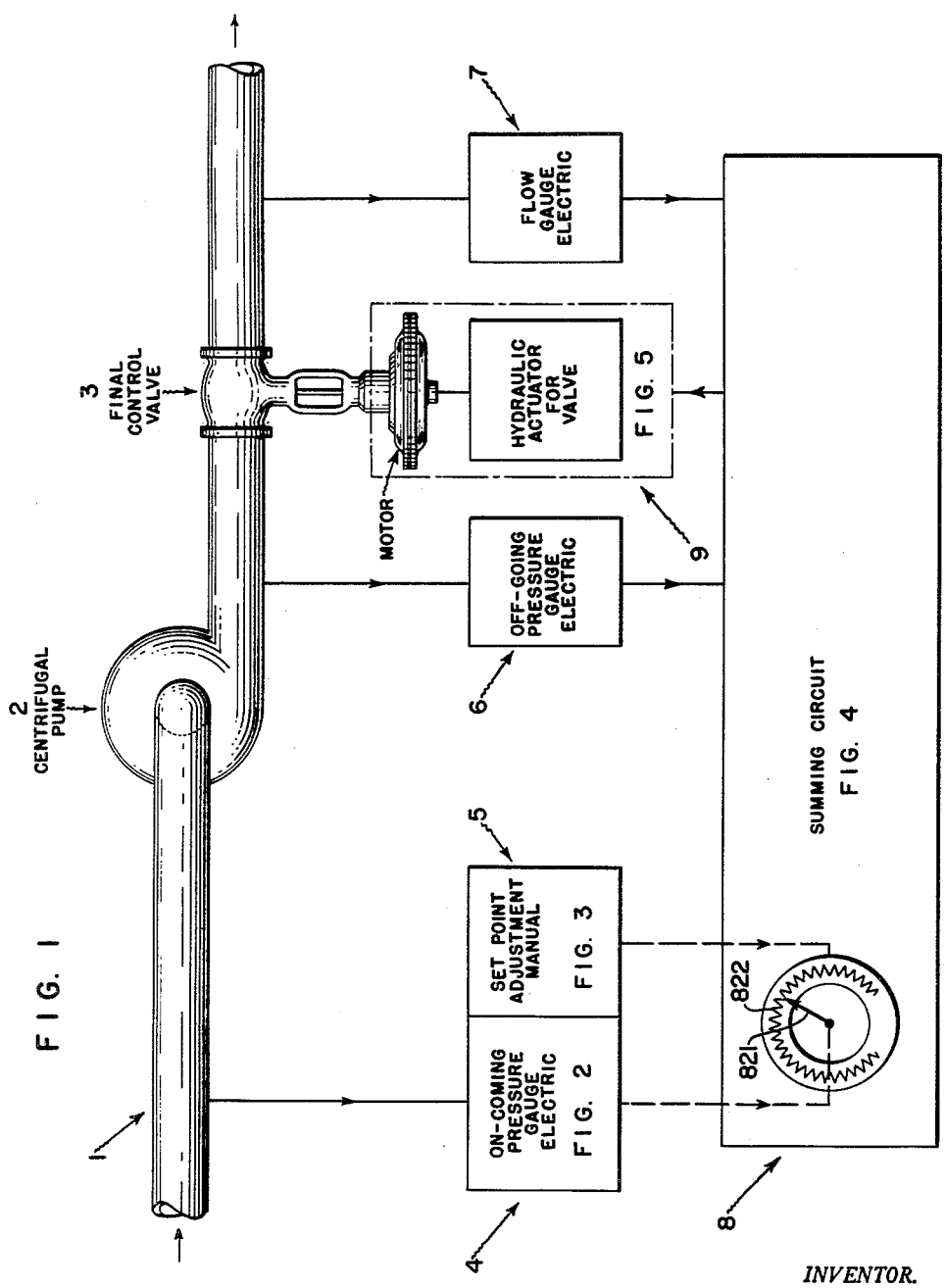
Fig. 1 is a block diagram showing the device of this invention.
Figure 2:
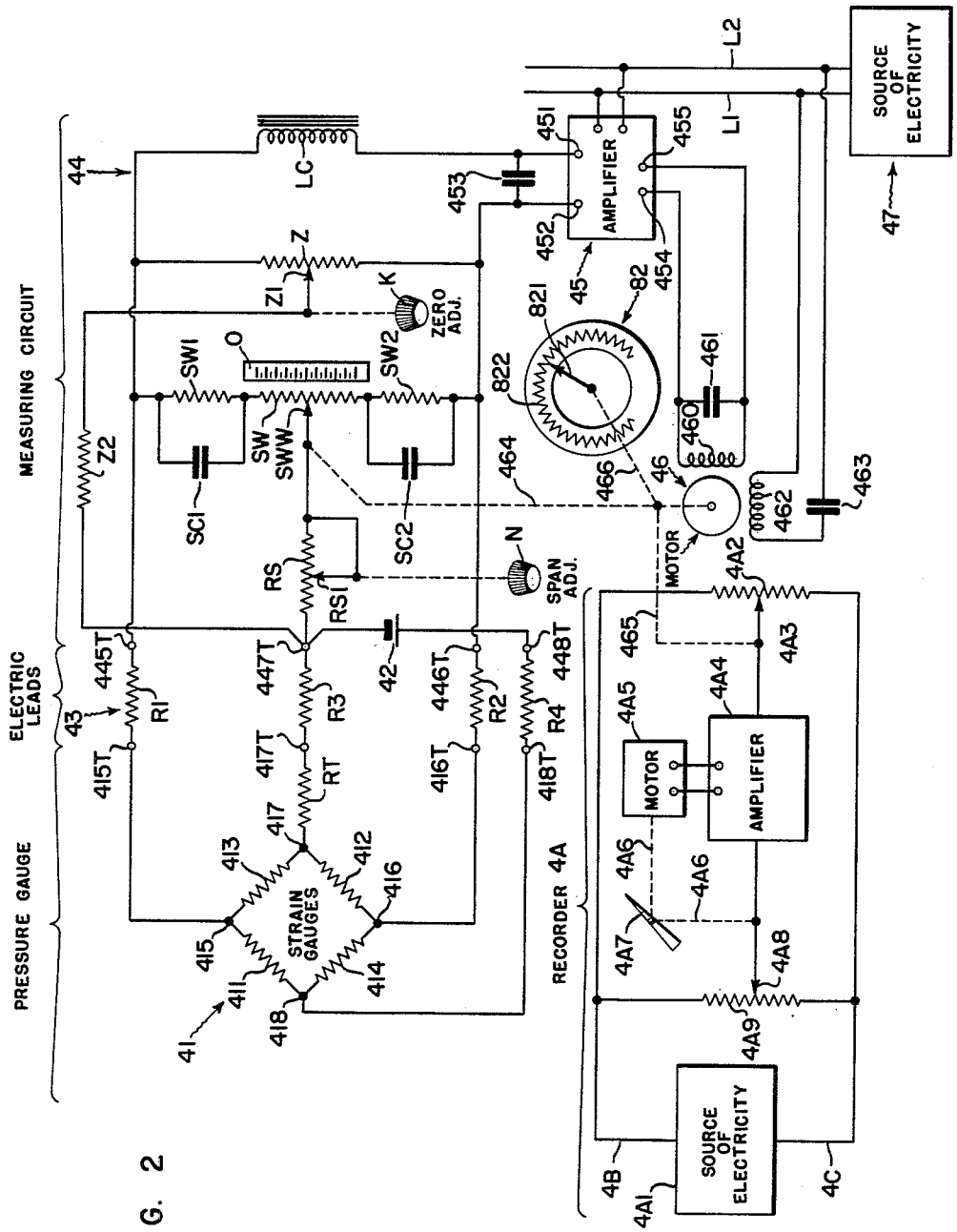
Fig. 2 is an electric circuit diagram showing one of the pressure gauges, the motor actuated thereby, and one of the pens of the recorder actuated by the motor.

Fig. 1 shows a pumping station for a pipeline which conveys a fluid, such as natural gas, or a liquid, such as petroleum. Such a pumping station comprises: a pipe 1; a centrifugal pump 2, which causes fluid or liquid to flow through pipe 1 in a direction indicated by the arrows; and a final control or throttling valve 3. The pressure of the fluid or liquid in pipe 1 on the on-coming side of pump 2 is measured by a gauge 4, which is illustrated in Fig. 2. Means are provided for preselecting a set value of the pressure from which the control measurements of the gauge 4 are to be made. These set point adjustment means are manually operable and are disclosed in Fig. 3. The pressure of the fluid or liquid in pipe 1 on the off-going side of pump 2 is measured by a gauge 6, which may be a duplicate of gauge 4. The flow of the fluid or liquid through pipe 1 is measured by a gauge 7, which may be a duplicate of gauge 4. Each of the gauges 4, 6, and 7 has a set point adjustment which duplicates the set point adjustment 5 shown in connection with gauge 4.

The output of gauge 4 drives the wiper 821 of the summing potentiometer which forms part of the summing circuit 8. The output of set point adjustment 5 drives the carrier for the slidewire 822 which cooperates with wiper 821 to form part of the summing potentiometer forming part of the summing circuit. Gauges 6 and 7 and the cooperating set point adjustments drive similar summing wipers and summing slidewires, as will be disclosed later in detain in Fig. 4.

The output of summing circuit 8 is a coil which controls the solenoid which, in turn, controls the flow of actuating fluid to the motor for the final control valve 3. The gauge 4 which measures the pressure of the fluid or liquid on the oncoming side of pump 2 is very similar to the device disclosed in application for U.S. Patent; Serial No. 481,884; filed January 14, 1955; by William H. Wannamaker, Jr. and Robert L. Miller, now Patent No. 2,844,775.

Gauge 4 is disclosed in Fig. 2. Gauge 4 comprises in general a Wheatstone bridge circuit 41, a source of electricity 42 for said bridge, a plurality of leads 43, a measuring circuit 44, an amplifier 45, a motor 46, and a source 47 of electricity for amplifier 45 and motor 46.

More specifically, the Wheatstone bridge circuit 41 comprises two similar resistors 411 and 412 constituting one opposed pair of bridge arms and two similar resistors 413 and 414 constituting a second pair of opposed bridge arms. The resistors 411, 412, 413, and 414 included in the circuit 41 may be associated with strain apparatus of such character and in such manner that a strain impressed on the apparatus will increase the resistance of resistors 411 and 412 and simultaneously decrease the resistance of the resistors 413 and 414 in predetermined accordance with the direction and magnitude of the strain increases in the resistances of the resistors 411 and 412. Only one, two, or three of the resistors 411, 412, 413, and 414, included in the circuit 41 may be strain responsive or subjected to strain.

The junction points of 415, 416, 417, and 418, of the circuit 41 are connected to the bridge terminals 415T, 416T, 417T, and 418T, respectively. The temperature-compensating resistor RT is connected between the junction 417 and the bridge terminal 417T. The bridge terminals 415T, 416T, 417T, and 418T are connected to the terminals 445T, 446T, 447T, and 448T of the measuring circuit 44 by means of lead resistances R1, R2, R3, and R4, respectively.

A source of current which energizes bridge circuit 41, shown here as battery 42, is connected between the measuring circuit terminals 447T and 448T. The measuring circuit terminals 445T and 446T are connected, respectively, to the input terminals 451 and 452 of the conversion-type electronic amplifier 45. A condenser 453 short circuits these terminals. A low-pass filter LC is included in the lead conductor adjacent condenser 453. A balancing slidewire SW and adjacent resistors SW1 and SW2 are connected between the instrument terminals 445T and 446T. The other ends of resistors SW1 and SW2 are connected to the slidewire SW. The resistors SW1 and SW2 are shunted by condensers SC1 and SC2, respectively, and cooperate therewith to subject the rebalancing mechanism to a damping action. The rebalancing connection between the instrument terminal 447T and the wiper contact SWW, engaging and adjustable along the slidewire SW, includes a span-adjusting resistor RS. This span-adjusting resistor RS includes a shunt RS1 adjustable along the resistor RS by means of a knob N. This varies the magnitude of that portion of resistor RS included in the measuring circuit. A separate zero-adjusting slidewire Z is also connected between the instrument terminals 445T and 446T. A wiper contact Z1, which engages and is adjustable along the slidewire Z, is connected to the instrument terminal 447T by a resistor Z2. The wiper contact Z1 is arranged for manual adjustment by means of a rotatable knob K. Rebalancing adjustment of the contact SWW along the slidewire SW is effected automatically by the amplifier 45 and the motor 46 which forms the associated rebalancing mechanism.

The amplifier 45 and the rebalancing mechanism may take any one of various well-known forms. The conversion type amplifier 45 and the associated reversible motor 46, which are shown, form self-balancing apparatus of the well-known and widely used type disclosed and claimed in U.S. Patent 2,423,540 of July 8, 1947 to Walter P. Willis.

As diagrammatically shown, the amplifier 45 has output terminals 454 and 455 connected to a winding 460 and a condenser 461 in parallel with said winding. This winding 460 forms the control winding of the motor 46, which is a reversible, two-phase, induction motor. The motor 46 includes a power winding 462 connected across the alternating current supply conductors L1 and L2 in series with the phase-shifting condenser 463. Conductors or lines L1 and L2 are connected to a source 47 of electricity. The motor 46 rotates in one direction or in the opposite direction depending upon the direction of current flow between the resistors R1 and R2 through the input terminals 451 and 452 of the amplifier 45. The resulting rotation of the motor 46 adjusts the wiper contact SWW along the slidewire resistor in the direction and to the extent required to eliminate the potential difference between the amplifier input terminals 451 and 452. In the normal, balanced condition of the apparatus, there is virtually no current flow between the terminals 451 and 452. The motor 46 adjusts the slidewire contact SWW through an operating connection shown diagrammatically as the linkage 464. The wiper contact SWW moves longitudinally along the scale 0 when the balance is disturbed.

The resistors 411, 412, 413, and 414, included in the circuit 41, are associated with strain apparatus so that a change in the pressure of the fluid or liquid in the pipe 1 in a given direction will decrease the resistance of the resistors 411 and 412 and simultaneously proportionally increase the resistances of the resistors 413 and 414. These resistors each have the same length and resistance as the other.

Fig. 2 also discloses a recorder 4A. Recorder 4A comprises a source of electricity 4A1 connected by leads 4B and 4C to the ends of a slidewire 4A2. A wiper 4A3 engages, at one end, with slidewire 4A2 and, at the other end, with one side of an amplifier 4A4. Amplifier 4A4 actuates a motor 4A5 which has an output shaft or linkage 4A6 which drives a pen or indicator 4A7. Output linkage 4A6 also moves a wiper 4A8 along a rebalancing slidewire 4A9 connected at its ends to leads 4B and 4C.

Motor 46, by means of linkages 464 and 465, actuates wiper 4A3 along slidewire 4A2. This unbalances the bridge circuit and causes motor 4A5 to actuate rebalancing wiper 4A8 until the voltage applied to rebalancing slidewire 4A9 equalizes that applied to the slidewire 4A2. When this balance has been reached, further movement of pen 4A7 stops.

Motor 46, by means of linkages 464 and 466, also actuates wiper 821 of the summing potentiometer 82 forming part of the summing circuit 8.

Fig. 3 shows an electric circuit comprising the set point adjustment 5. This set point adjustment comprises a source 51 of electricity connected by means of leads 52 and 53 to the end of an input slidewire 54 and to the ends of a rebalancing slidewire 64. By means of a handle or knob 56 a wiper 55 may be manually adjusted along slidewire 54 so as to vary the voltage applied from the slidewire 54 to one side of the amplifier 57. Amplifier 57 actuates motor 58 which has an output linkage 59. This linkage has a branch 60. Motor 58, by means of output linkages 59 and 60, adjusts rebalancing wiper 63 along rebalancing slidewire 64 until the voltage on slidewire 64 equals the voltage on the input slidewire 54. When these two voltages are equal, further movement of motor 58 ceases. Motor 58, by means of output linkages 59 and 62 actuates the carrier on which is mounted the slidewire 822, which forms part of the summing potentiometer forming part of the summing circuit 8. Motor 58, by means of output linkages 59 and 61, actuates wiper 4D3 along a slidewire 4D2. This actuates a bridge circuit including a source 4D1 of electricity connected by leads 4X and 4Y to the ends of input slidewire 4D2 and to the ends of rebalancing slidewire 4D9. Input wiper 4D3 engages slidewire 4D2 and is connected to one side of amplifier 4D4. Rebalancing wiper 4D8 engages slidewire 4D9 and is connected to the other side of amplifier 4D4. Amplifier 4D4 actuates motor 4D5 which has an output linkage 4D6 which actuates a second pen 4A77, which forms part of the recorder 4A. Linkage 4D6 also actuates wiper 4D8 to rebalance the bridge circuit which actuates motor 4D5.

Fig. 4 discloses the details of the summing circuit 8. One of a series of isolated power sources 81 of electricity is connected by leads 811 and 812 to the ends of a slidewire 813 with which cooperates a wiper 814 to provide means for adjusting the proportional band of the gauge 4, which measures the pressure on the on-coming side of pump 2. Wiper 814 is connected at junction 815 to one end of slidewire 822 forming part of the summing potentiometer 82. One end of lead 812 is connected to the other end of summing slidewire 822. Junction 815 is connected by lead 831 to amplifier 83. Wiper 821, which cooperates with slidewire 822, is electrically connected to one end of the slidewire of a second potentiometer 82A. As has already been explained, wiper 821 is mechanically rotated by pressure gauge 4 and slidewire 822 is mechanically rotated by the set point adjustment 5, which cooperates with gauge 4.

Summing potentiometers 82A and 82B are duplicates in all respects of summing potentiometer 82 and therefore need not be described in detail. Summing potentiometer 82A is driven by gauge 6 and its cooperating set point adjustment. Summing potentiometer 82B is driven by gauge 7 and its cooperating set point adjustment.

Amplifier 83 is connected by leads 832S4 and 832S3 to motor 84. Motor 84 has a mechanical connection 841 which branches. Branches 841 and 842 serve to rotate wiper 851 of the feedback potentiometer 85. Wiper 851 is electrically connected by lead 832 to the opposite side of amplifier 83. Wiper 851 cooperates with slidewire 852. Slidewire 852 is connected by leads 854 and 855 to another one of the sources 81.

Summing circuit 8 also includes a transmitting potentiometer 86 comprising a wiper 861 cooperating with a slidewire 862. Wiper 861 is driven by motor 84 by means of linkages 841 and 843. Slidewire 862 is mounted on a ring 863 of insulating material and is connected, at one end, by lead 868 to terminal 867 of another one of the sources 81. Wiper 861 is connected by lead 864 to coil 88 which forms the input to the hydraulic circuit shown in Fig. 5. The output side of coil 88 is connected by lead 865 to terminal 866 of another one of the sources 81.

Fig. 5 shows the hydraulic actuator 9 for the final control valve 3. Actuator 9 comprises a source 90 of liquid, such as oil, under a high pressure. This liquid from source 90 enters through a restriction 91 to a conduit 92, which exhausts to the sump or on-coming side of the pump (not shown) which applies the pressure to the liquid. The flow of oil through conduit 92 is controlled by a cup-shaped valve 93 which is biased by a spring 94 into position in which valve 93 closes conduit 92. The stem 95 of valve 93 is connected to one end of a lever 96 pivoted at 97 and carrying at its opposite end an armature 98. Armature 98 is rocked in one direction or the other about pivot 97 by the flow of current through coil 88 which causes a magnetic flow through path 99. Thus the flow of current through coil 88 can open or close valve 93.

Conduit 92 and valve 93 are connected by conduits 901 and 902 to a pressure relief valve 903 which is biased by a spring 904 to close conduit 902. The pressure which spring 904 exerts on exhaust valve 903 is varied by manually adjusting screw 906 in valve casing 905.

The liquid, at a pressure controlled by valve 93, is conducted through conduit 901 and 908 to chamber 910. The pressure of this liquid may be read on gauge 907. Chamber 910 is cylindrical having a movable wall thereof formed by a piston 921 attached to valve stem 920 which has annular grooves 923 and 924 on the outer surface thereof. A spring 925 in a chamber (which is open to atmosphere or feeds to the sump of the pump at 926) opposes the pressure of the oil in chamber 910.

Valve casing 930 has a cylindrical passage which fits with the outer surface of valve stem 920. Casing 930 contains annular grooves 932, 934 and 935 in it. Liquid under pressure is conducted directly from source 931 to groove 932 and, through conduit 933, to groove 934. Groove 935 communicates with exhaust or sump through conduit 993.

Groove 923 communicates through conduit 941 with chamber 942. Groove 924 communicates through conduit 946 with chamber 943. Chambers 942 and 943 are cylindrical and are located on opposite sides of piston 950, which forms a movable wall of each cylindrical chamber. Piston rod 951 passes out of chamber 942 and is pivoted at 952 to one end of rod 957 which is connected at 958 to one end of spring 959, the opposite end of which is connected at 927 to valve stem 920. Rod 951 and lever 957 and spring 959 thus form a feedback connection from piston 950 to valve 920.

Piston rod 951 is also pivoted at 953 to one end of lever 955 which has a stationary pivot at 954 and a pivot 956, at the opposite end thereof, to the final control valve 3.

The final control valve 3 comprises a valve casing 30 having an inlet connection 31 and an off-going connection 32 with pipe 1. The flow of fluid through pipe 1 is throttled or cut off completely by means of valve plug 33 which is actuated by valve stem 34 by means of the pivotal connection 953 between valve stem 951 and lever 955 and the pivotal connection 956 between lever 955 and valve stem 34.

Operation

When it is desired to start up this control system, the following adjustments must be made manually in order to place the system in operating condition. Gauge 4 is adjusted to the proper span by means of knob N and to proper zero by means of knob K, as best seen in Fig. 2. The proportional band of gauge 4 is adjusted by moving wiper 814 along slidewire 813, as best seen in Fig. 4. The preselected or datum point, from which the control of the measurements of gauge 4 are to be made, is selected by set point adjustment means 5.

Fig. 3 shows that this set point adjustment may be done by turning knob 56 manually so as to adjust wiper 55 along slidewire 54 and thereby mechanically positioning slidewire 822 with relation to its wiper 821. Similar adjustments are made of gauges 6 and 7 by manually moving the corresponding part thereof. The hydraulic actuator 9 is adjusted to the maximum pressure of liquid which will give maximum position of valve 3 by turning handle 906 which adjusts the pressure which will cause maximum pressure in conduit 902.

The centrifugal pump 2 can then be started and fluid or liquid pumped through the pipeline 1. Until one of the set points is reached, no control action takes place and final control valve 3 remains wide open. If, however, for example, the pressure in pipeline 1 on the oncoming side of centrifugal pump 2 reaches that value which has been selected by the set point adjustment means 5, the gauge 4 causes the wiper 821 to move with relation to the slidewire 822. This causes an unbalance in the summing circuit 8, which unbalance causes amplifier 83 to actuate motor 84. This movement of motor 84, by means of linkages 841 and 842, adjusts wiper 851 relative to slidewire 852 and thus rebalances the voltages applied in the summing circuit. Simultaneously, movement of motor 84, by means of linkages 841 and 843, causes the transmitting potentiometer 86 to operate. This operation is caused by movement of wiper 861 along slidewire 862 which causes a change in the current flowing through the coil 88 of the solenoid which operates the cup valve 93. As is best seen in Fig. 5, a change of current through coil 88 causes a change in magnetic flux along path 99 and thereby causes armature 98 to rock in one direction or the other about pivot 97 and thereby causes valve 93 to move with relation to conduit 92 and to vary the flow of liquid through the conduit. Any variation in the flow of liquid through conduit 92 varies the pressure of the liquid in chamber 910. This change in pressure in chamber 910 causes valve stem 920 to move longitudinally.

Assume that the foregoing operations take place in such a way that the pressure of the liquid in chamber 910 increases, this causes valve stem 920 to move toward the top of Fig. 5. This movement of valve stem 920 causes groove 923 to connect conduits 933 and 934 to conduit 941 and to thereby admit liquid under pressure from source 931 to chamber 942. Simultaneously, groove 924 connects conduit 946 to conduit 993, so that liquid under pressure can escape from chamber 943 through conduit 946, grooves 924 and 935 to exhaust or sump through conduit 993.

This increase in pressure in chamber 942 and decrease in pressure in chamber 943, causes piston rod 951 to move toward the bottom of Fig. 5. This movement of piston rod 951 causes lever 957 to compress spring 959 and thereby move valve stem 920 in the opposite direction to that in which it was moved by the pressure in chamber 910. This opposite direction is toward the bottom of the sheet in Fig. 5. Simultaneously, movement of piston rod 951 causes pivot 953 to rock lever 955 and thereby to move the valve plug 33 upward to open communication between inlet 31 and exhaust 32 of the final control valve 33.

Obviously, a change in the opposite direction in the pressure in pipe 1 applied to gauge 4 will cause a series of operations to reverse to those just described.

A change in the pressure in the fluid or liquid on the off-going side of centrifugal pump 2 is applied to gauge 6 and causes a similar sequence of operation to gauge 6 and the summing potentiometer 82A controlled thereby. A change of the flow of fluid or liquid through pipeline 1 causes flow gauge 7 to actuate the summing potentiometer 82B, which is controlled thereby, to cause a similar sequence of operation.

What is claimed is:
1. Means for bringing into closed position a final control valve actuated over a range of movement by a hydraulic-pressure-operated motor, said means including a first conduit in which said final control valve is mounted so as to control the flow of fluid through said first conduit, a second conduit mechanically connected to said motor for supplying liquid under pressure to said motor, an hydraulic actuator mechanically connected to said second conduit and operable to vary the pressure of the liquid fed to said motor in response to an electric signal applied to said actuator, a first electric pressure gauge responsive to a pressure controlled by the final control valve, a first manually operable means for adjusting the set point of said first electric gauge, a first summing potentiometer having one electrically conducting part mechanically connected to and moveable in response to said electric gauge and having a cooperating electrically conducting part mechanically connected to and moveable in response to manual operation of said set point adjusting means, a second electric pressure gauge responsive to a second pressure controlled by the final control valve, a second manually operable means for adjusting the set point of said second electric gauge, a second summing potentiometer having one electrically conducting part mechanically connected to and moveable in response to said second electric gauge and having a second cooperating electrically conducting part mechanically connected to and moveable in response to manual operation of said second set point adjusting means, means connecting said first electric pressure gauge and said second electric pressure gauge to said first conduit at points spaced in the direction of flow of fluid through said first conduit, a third electric gauge responsive to a variable controlled by the final control valve, a third manually operable means for adjusting the set point of said third electric gauge, a third summing potentiometer having one electrically conducting part mechanically connected to and moveable in response to said third electric gauge and having a third cooperating electrically conducting part mechanically connected to and moveable in response to manual operation of said third set point adjusting means, a summing circuit in which the electrically conducting parts of said summing potentiometers are electrically interconnected, an amplifier electrically connected in said summing circuit and connected to the electrically conducting parts of each of said summing potentiometers and responsive to any one of said summing potentiometers reaching its setpoint, a feed-back potentiometer electrically connected in said summing circuit, a transmitting potentiometer electrically connected in said summing circuit, an electric motor electrically connected in said summing circuit and responsive to the electrical output of said amplifier and having mechanical connection with feed-back potentiometer to cause said feed-back potentiometer to rebalance the summing circuit and having mechanical connection with said transmitting potentiometer to cause movement thereof, said hydraulic actuator for the final control valve being electrically connected to and responsive to the electrical output of said transmitting potentiometer.

2. Means according to claim 1 in which at least one of said gauges is an electric resistance strain gauge responsive to the pressure to be gauged.

3. Means according to claim 1 in which a two-pen recorder has one pen connected to respond to one of said gauges and another pen connected to respond to the set point adjustment therefor.

4. Means according to claim 1 in which at least one of said gauges is an electric resistance strain gauge responsive to the pressure to be gauged and electrically connected in a measuring circuit including an amplifier and a motor responsive to said amplifier, a rebalancing slidewire electrically connected in said measuring circuit, a mechanical connection from said motor to said rebalancing slidewire, and a mechanical connection between said motor and one electrically conducting part of said summing potentiometer.

5. Means according to claim 1 in which said set point adjustment is an electric bridge circuit including a manually adjustable potentiometer, an amplifier electrically connected so as to be responsive to the adjustment of said potentiometer, a motor electrically connected so as to be responsive to the energization of said amplifier, and a mechanical connection between said motor and said feed-back potentiometer whereby said motor rebalances said bridge circuit.

6. Means according to claim 1 in which said hydraulic actuator includes a cup valve controlling the pressure of a supply of liquid under pressure, a control valve actuated by the pressure of said supply of liquid, the hydraulic pressure-actuated motor being under the control of said control valve and adapted to actuate the final control valve.

References Cited in the file of this patent

UNITED STATES PATENTS 1,977,559    Lewis et al. _____ Oct. 16, 1934